US008069193B2

(12) United States Patent
Cu et al.

(10) Patent No.: US 8,069,193 B2
(45) Date of Patent: Nov. 29, 2011

(54) METHOD AND SYSTEM FOR UTILIZING A GENERIC SCALAR FUNCTION TO ALLOW A COLUMN FUNCTION TO OPERATE ON ROW DATA

(75) Inventors: Jason Alexander Cu, San Jose, CA (US); Christopher John Crone, San Jose, CA (US); Andrei Fedorovich Lurie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 09/820,451

(22) Filed: Mar. 28, 2001

(65) Prior Publication Data
US 2002/0143748 A1 Oct. 3, 2002

(51) Int. Cl.
*G06F 12/00* (2006.01)
*G06F 15/16* (2006.01)
*G06F 7/00* (2006.01)
*G06F 17/30* (2006.01)
*G06F 9/455* (2006.01)

(52) U.S. Cl. ............ 707/899; 707/713; 707/759; 703/27
(58) Field of Classification Search ............... 707/2–4, 707/200–206; 717/5–8, 11; 705/100–101, 705/106, 111, 135
See application file for complete search history.

(56) References Cited

U.S. PATENT DOCUMENTS

| | | | |
|---|---|---|---|
| 5,513,366 A | 4/1996 | Agarwal et al. | |
| 5,548,754 A | 8/1996 | Pirahesh et al. | |
| 5,590,324 A | 12/1996 | Leung et al. | |
| 5,615,361 A | 3/1997 | Leung et al. | |
| 5,822,750 A | 10/1998 | Jou et al. | |
| 5,918,225 A | 6/1999 | White et al. | |
| 6,289,336 B1 * | 9/2001 | Melton et al. | 707/3 |
| 6,317,738 B1 * | 11/2001 | Lohman et al. | 1/1 |
| 6,366,903 B1 * | 4/2002 | Agrawal et al. | 1/1 |
| 6,438,538 B1 * | 8/2002 | Goldring | 1/1 |
| 6,553,366 B1 * | 4/2003 | Miller et al. | 707/2 |
| 6,691,099 B1 * | 2/2004 | Mozes | 707/2 |
| 6,691,259 B1 * | 2/2004 | Mackey et al. | 714/46 |
| 6,947,934 B1 * | 9/2005 | Chen et al. | 1/1 |
| 7,269,580 B2 * | 9/2007 | Matichuk | 706/53 |

OTHER PUBLICATIONS

*Compute Date/Time Scalar Functions at Compile Time When All Arguments Are Constants*, IBM Technical Disclosure Bulletin, vol. 34, No. 4B, Sep. 1991, pp. 174-175.
*Enhancements to the SQL Date/Time Scalar Functions*, IBM Technical Disclosure Bulletin, vol. 34, No. 4B, Sep. 1991, pp. 298-300.

* cited by examiner

Primary Examiner — Susan Chen
(74) Attorney, Agent, or Firm — Sawyer Law Group, P.C.

(57) ABSTRACT

A method and system for utilizing a column function for a relational database in a structure query language (SQL) environment is disclosed. The column function is capable of performing an operation on an indeterminate number of entries. The relational database utilizes data including a plurality of entries capable of being organized into at least one column and at least one row. The method and system include allowing a user to specify the at least one row as an argument for a generalized scalar function and simulating a column environment for the at least one row using the generalized scalar function to allow the at least one row to be provided to the column function as though the at least one row was a column. The method and system also include performing the column function on the at least one row to provide at least one output.

26 Claims, 4 Drawing Sheets

METHOD AND SYSTEM FOR UTILIZING A GENERIC SCALAR FUNCTION TO ALLOW A COLUMN FUNCTION TO OPERATE ON ROW DATA

FIELD OF THE INVENTION

The present invention relates to relational databases, and more particularly to a method and system for allowing pre-existing column functions to be used to perform operations on data in rows.

BACKGROUND OF THE INVENTION

Relational databases are utilized to archive, obtain access to and perform operations on data. Data in a relational database can be expressed in the form of a table having multiple entries. FIG. 1 depicts a conventional table 1 for a conventional relational database. The table 1 includes entries 11, 12, 13, 14, 15, 16, 17, 18, 19, 20, 21 and 22. The entries 11 through 22 are arranged in rows and columns. The table 1 has four columns 2, 3, 4 and 5 having three entries each and three rows 6, 7 and 8 having four entries each. Thus, the table 1 is a four by three table. However, the table 1 could have any number of entries arranged in a different number of columns.

Often, a user desires to perform operations on data stored in the entries 11, 12, 13, 14, 15, 16, 17, 18, 19, 20, 21 and 22 of the table 1. For example, a user might desire to determine the maximum or minimum value of a particular column, to perform a mathematical operation on the data in one or more entries 11, 12, 13, 14, 15, 16, 17, 18, 19, 20, 21 and 22 or otherwise utilize the data stored in the table 1. In addition, operations on the relational database are typically implemented using structure query language ("SQL"). SQL has conventional built-in functions which can be used to perform these operations on the data in the table 1.

The conventional functions in SQL that are used by the relational database can typically be categorized as conventional scalar functions and conventional column functions. A conventional scalar function operates on a predetermined number of entries. For example, one conventional scalar function is the square root function ("SQRT"). This function always operates on a single entry and would, therefore, have a single argument as an input. The function SQRT (entry 11) would provide the square root of the value in entry 11 of the table 1. Another conventional scalar function might operate on more than one entry. However, the number of entries for which the conventional scalar function performs its operation is always predetermined by the function at the time the function is written.

A column function performs an operation on a set of data and returns a single result. As its name suggests, the conventional column function typically performs an operation on one column of data. For example, in the table 1, a conventional column function might perform an operation on all of the entries in one of the column 2, 3, 4 or 5. A conventional column function thus has one of the columns 2, 3, 4, or 5 as its argument. For example, a conventional minimum function (MIN) could be written as MIN (col. 2) and would return the minimum of column 2.

A conventional column function can also perform an operation on an indeterminate number of entries. In other words, the actual number of entries for which the conventional column performs an operation is not determined at the time the conventional column function is written. Instead, the number of entries for which conventional column function performs an operation depends upon the number of entries in the column that is used as an argument for the conventional column function. For example, the table 1 has three rows 6, 7 and 8. A conventional column function which operates on, for example, column 2 would operate on the three entries that are the portions of the three rows 6, 7 and 8 corresponding to column 2. If the same conventional column function is used with a different table having a different number of rows, then the number of entries operated on would be different. Consequently, the conventional column function utilizes an indeterminate number of entries. Note that although the actual number of entries is not predetermined, in a particular implementation, there may be some upper limit to the number of entries allowed in a column, for example due to hardware or other limitations. Examples of a conventional column function include minimum, maximum, sum, and average functions which return the minimum value, maximum value, sum of all values, and average of all values, respectively, for the entries in a column. For example, the maximum of the column 2 would provide the maximum of the values stored in entries 11, 15, and 19 of the column 2 in table 1.

Processing of a conventional column function typically includes three phases: initialization, evaluation and finalization. In the initialization phase, the column function performs the procedures necessary for commencing the column function. For example, counters could be cleared and flags reset. In the evaluation phase, the column function actually performs the processes required for data in individual entries of the table 1. The finalization phase carries out any additional processes required to provide the output of the column function.

FIG. 2 depicts a conventional method 50 for performing a conventional column function. The conventional method 50 will be described in the context of the table 1 depicted in FIG. 1. For ease of explanation, it is assumed that the conventional column function is to be performed starting with column 3 of the table 1. Referring to FIGS. 1 and 2, a row 6 is fetched, via step 52. If the entry is the first entry of the column, then the initialization phase is performed, via step 54. Because the row 6 includes the first entry 12 of the column 3, initialization is performed in step 54. The evaluation phase would then be performed, via step 56. Steps 52-56 are then repeated for the remaining rows in the table 1, via step 58. Thus, the next row 7 would be fetched and the data in the entry 16 corresponding to the column 3 evaluated. The row 8 would then be fetched and the data in the entry 20 corresponding to the column 3 evaluated. Once evaluation is performed for row 8, the last row in the table 1, the finalization phase is carried out, via step 60. Thus, the column function would perform operations for each entry in the column 3 that is an argument for the column function.

Although the conventional method 50 allows the conventional column function to perform operations on an indeterminate number of entries, one of ordinary skill in the art will readily recognize that the conventional column function can only operate based on one of the columns 2, 3, 4 and 5. One of ordinary skill in the art will also readily recognize that a user may also desire to perform similar operations on the rows 6, 7 and 8. However, SQL defines a data set, on which the conventional column function operates, as including one or more of the columns 2, 3, 4 and 5. SQL does not have a mechanism for defining a data set based on the rows 6, 7 or 8 rather than the columns 2, 3, 4 and 5. Thus, the conventional column function cannot perform its operations based on rows 6, 7 and 8 instead of columns 2, 3, 4 and 5.

In order to perform column functions for rows of data, a developer can write conventional row functions that are analogous to the conventional column functions and which are specially designed to perform operations on rows 6, 7 or 8 of data. However, to do so would require a significant expenditure of time and resources. It would also be desirable to avoid this expenditure of time and resources.

Accordingly, what is needed is a system and method for performing operations for column functions based on rows instead of columns. The present invention addresses such a need.

SUMMARY OF THE INVENTION

The present invention provides a method and system for utilizing a column function for a relational database in a structure query language (SQL) environment. The column function is capable of performing an operation on an indeterminate number of entries. The relational database utilizes data including a plurality of entries capable of being organized into at least one column and at least one row. The method and system comprise allowing a user to specify at least one row as an argument for a generalized scalar function and simulating a column environment for the at least one row using the generalized scalar function to allow that row to be provided to the column function as though the row was a column. The method and system also comprise performing the column function on the row to provide at least one output.

According to the system and method disclosed herein, the present invention allows pre-existing column functions to be used to perform operations on rows of data.

DETAILED DESCRIPTION OF THE INVENTION

The present invention relates to an improvement in relational databases implemented in a structure query language (SQL) environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for utilizing a column function for a relational database in a structure query language (SQL) environment. The column function is capable of performing an operation on an indeterminate number of entries. The relational database utilizes data including a plurality of entries capable of being organized into at least one column and at least one row. The method and system comprise allowing a user to specify the at least one row as an argument for a generalized scalar function and simulating a column environment for the at least one row using the generalized scalar function to allow the at least one row to be provided to the column function as though the at least one row was a column. The method and system also comprise performing the column function on the at least one row to provide at least one output. Thus, the generalized scalar function in combination with the column function allow the operation of the column function to be performed for the indeterminate number of entries in the at least one row.

Note that although the present invention is described in the context of an indeterminate number of entries, in a preferred embodiment, there is an upper limit to the number of entries that the column function and thus the generalized scalar function can accommodate. In a preferred embodiment, a table has an upper limit of seven hundred and fifty columns and the limit of the number of entries is approximately 32,766. Furthermore, although the present invention is described in the context of a particular implementation and particular column functions, such as the minimum and maximum function, one of ordinary skill in the art will readily recognize that the present invention can be used with other column functions and in other implementations.

Figure 1:
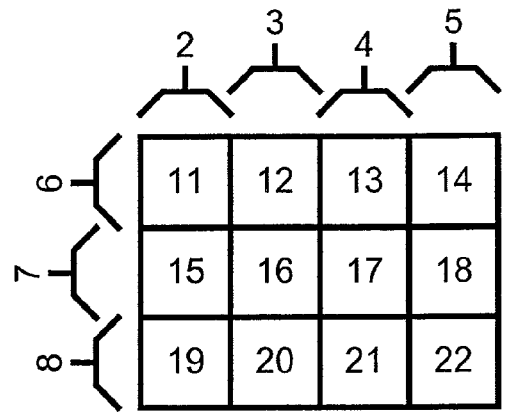
FIG. 1 is a diagram of a table in a relational database.
Figure 2:
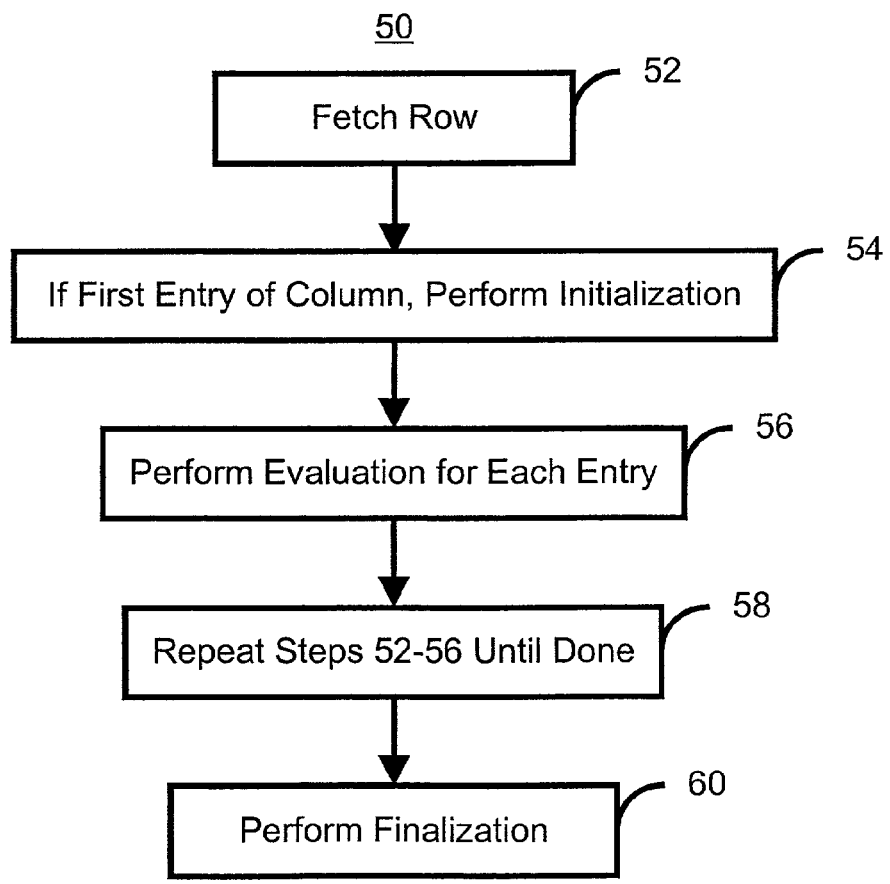
FIG. 2 is a flow chart of a conventional method for performing a column function.
Figure 3:
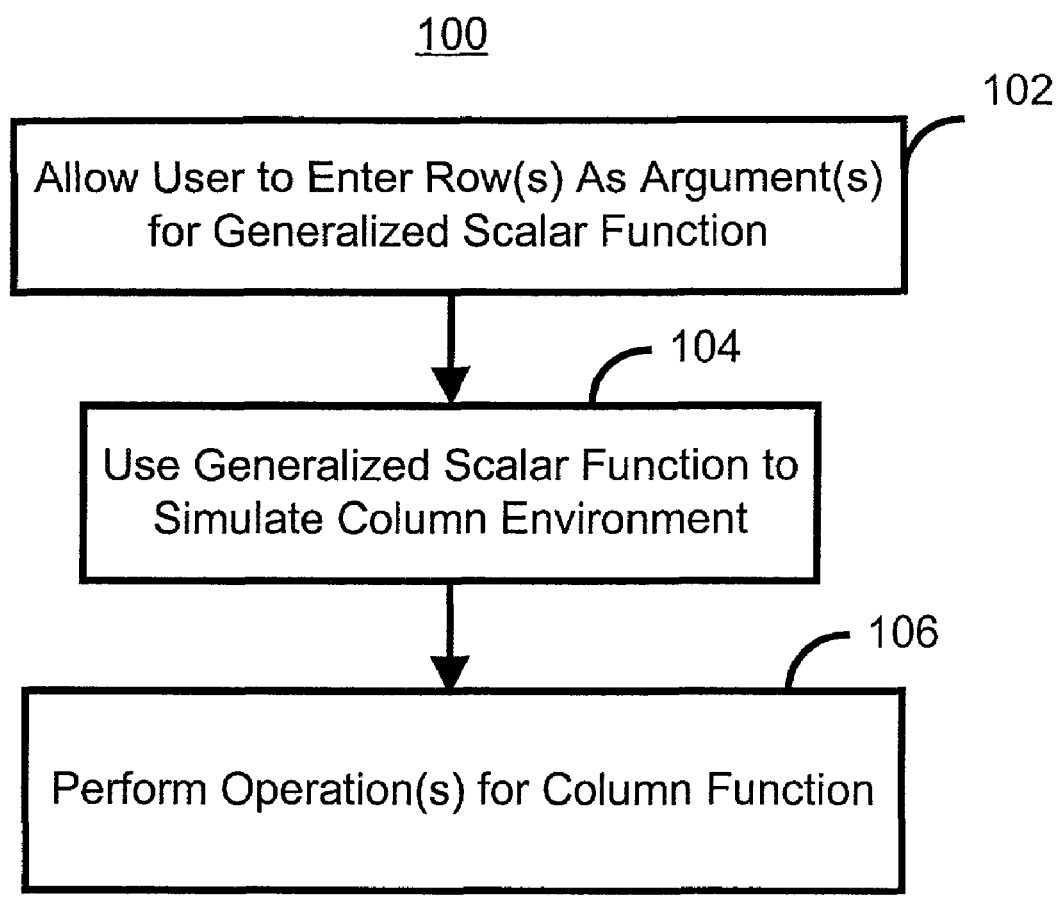
FIG. 3 is a high-level flow chart of one embodiment of a method in accordance with the present invention for utilizing a column function with one or more rows of a table.

To more particularly illustrate the method and system in accordance with the present invention, refer now to FIG. 3, depicting one embodiment of a method 100 in accordance with the present invention for utilizing a conventional column function with one or more rows of a table. The method 100 will be described in conjunction with the table 1 depicted in FIG. 1 for a relational database. The method 100 is preferably implemented in a SQL environment.

A user is allowed to specify one or more of the rows 6, 7 and 8 as the argument for a generalized scalar function, via step 102. Preferably, step 102 is carried out by allowing the user to specify the columns in the row as arguments for the generalized scalar function. For example, if the generalized scalar function is to find the minimum of row 6, then the MINIMUM (col. 2, col. 3, col. 4, col. 5) is provided in step 102. Similarly, if the generalized scalar function is to find three minima of three rows 6, 7 and 8, then the minimum for each of the three rows is requested in step 102. The generalized scalar function is to be used with a corresponding conventional column function. In the example above for row 6, the generalized scalar function is used with the conventional column function that returns the minimum of a column. The generalized scalar function is termed a scalar function because the number of arguments is preferably predetermined at the time the generalized scalar function is written.

Using the generalized scalar function, a column environment is simulated for the row, such as row 6, that is an argument for the generalized scalar function, via step 104. Simulating the column environment allows the row, such as row 6, that is an argument for the generalized scalar function to appear to the corresponding column function as a column. Stated differently, the generalized scalar function takes the row data for the row input to the generalized scalar function and provides the row data to the corresponding conventional column function such that the corresponding column function can use the data. Also in step 104, the row that is an argument for the generalized scalar function is provided to the corresponding conventional column function in the column environment. In other words, the generalized scalar function may call the corresponding conventional column function and provide to the corresponding conventional column function the row data in a manner that allows the corresponding column function to use the row data as if the row were a column. Thus, the conventional column function receives data from each row 6, 7 and 8 as though each row 6, 7 and 8 is a column. The conventional column function performs its operations on the rows 6, 7 and 8 provided to the column function in the column environment to return outputs, via step 106. Thus, the conventional column function functions as it normally would in step 106. In the minimum examples described above, the resultant of step 106 would be the minimum of row 6 or the minimum of rows 6, 7 and 8. Thus, using the method 100, the column function can be performed for the indeterminate number of entries in one or more of the rows 6, 7 and 8. In the method 100, the generalized scalar function provides the entries in the row(s) to the corresponding column function in a manner that allows the corresponding column function to use the data, thereby simulating a column. The conventional column function then operates on the (simulated) column. This allows the column function to operate on a row having an indeterminate number of entries without rewriting the column function.

Thus, the conventional column function can be used to perform operations on rows 6, 7 and 8 of data in the table 1. This is possible without requiring that the conventional column function be rewritten. Instead, the conventional column function is reused with the generalized scalar function. Thus, the resources that would be required to rewrite, test, and ensure the same results are returned from the column function and the scalar function implementation are saved.

Figure 4:
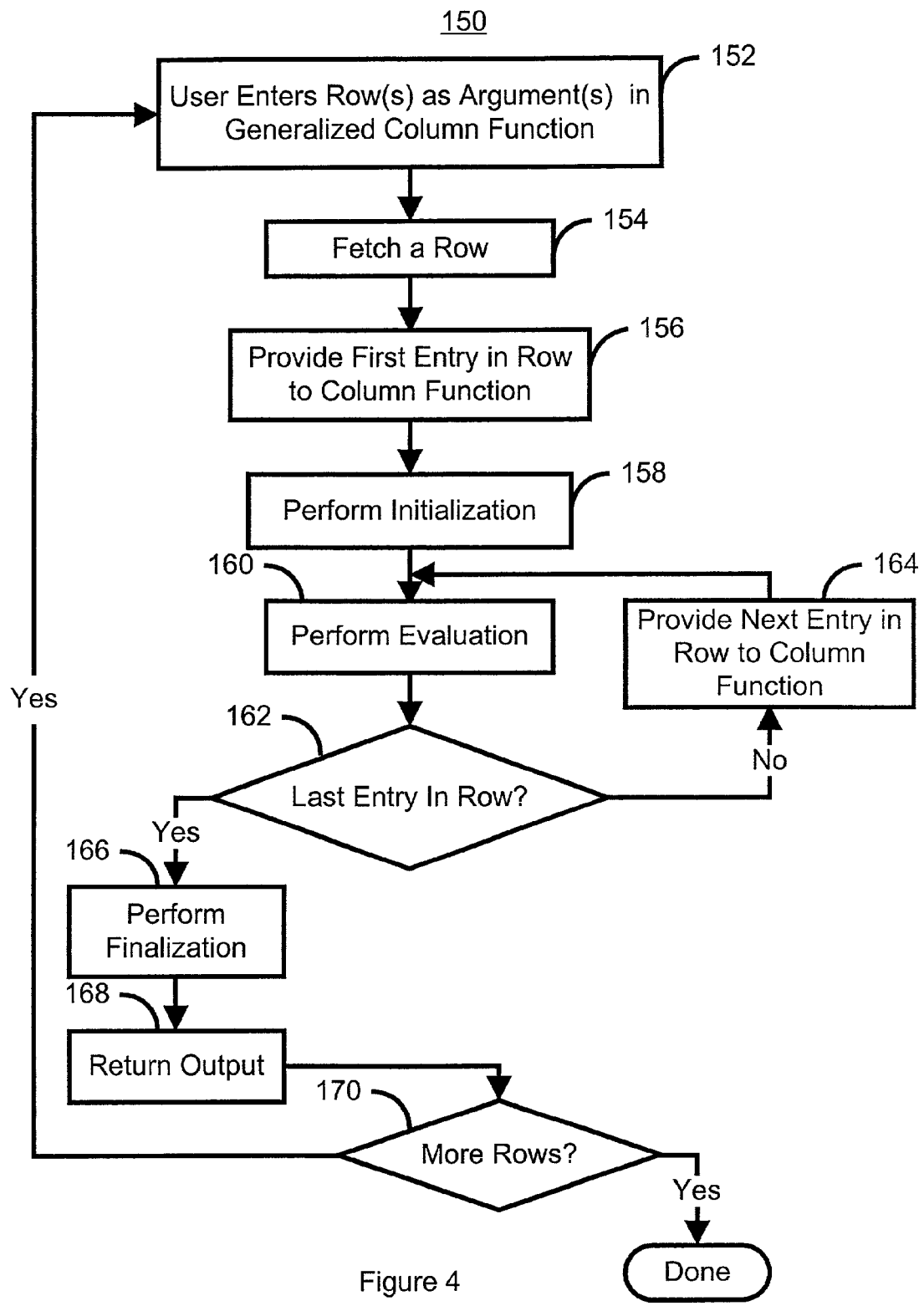
FIG. 4 is a more detailed flow chart of one embodiment of a method in accordance with the present invention for utilizing a column function with one or more rows of a table.

FIG. 4 is a more detailed flow chart of one embodiment of a method 150 in accordance with the present invention for utilizing a column function with one or more rows of a table. The method 150 will be described in conjunction with the table 1 depicted in FIG. 1 for a relational database. The method 150 is preferably implemented in a SQL environment.

A user is allowed to specify one or more of the rows 6, 7 and 8 as the argument for a generalized scalar function, via step 152. The generalized scalar function is described above with respect to the method 100 depicted in FIG. 3. Referring back to FIGS. 1 and 4, a row 6, 7 or 8 of the table 1 is fetched, via step 154. A first entry of the row 6, 7 or 8 is provided to the conventional column function, via step 156. Thus, steps 154, 156 and 164 (discussed below) are used to simulate the column environment for the rows 6, 7 or 8 that is input as an argument to the generalized scalar function. An initialization phase for the conventional column function is carried out, via step 158. Once the initialization phase is performed or if it is determined that the entry provided is not the first entry, then an evaluation phase is performed, via step 160. Thus, the operations necessary for the conventional column function to provide an output are performed in step 160. Step 160 might include adding the data in the entry to a running sum or determining whether the data in the entry is the minimum or maximum encountered. It is determined whether the entry is the last entry in the row 6, 7 or 8, via step 162. If not, the next entry in the row is provided to the conventional column function, via step 164. The method 150 then returns to step 160 to the evaluation phase for subsequent entries. If the entry is the last in the row 6, 7 or 8, then the conventional column function enters it finalization phase, via step 166 and returns an output, via step 168. It is then determined whether there are any additional arguments in the generalized scalar function, via step 170. If so, step 152 is returned to so that the next row can be fetched. Otherwise, the method 150 terminates.

Using the method 150, the conventional column function performs operations on entries in rows 6, 7 and 8 of data in the table 1. This is possible without requiring that the conventional column function be rewritten. Instead, the conventional column function is reused with the generalized scalar function. Thus, the resources that would be required to rewrite the conventional column function are saved.

Figure 5:
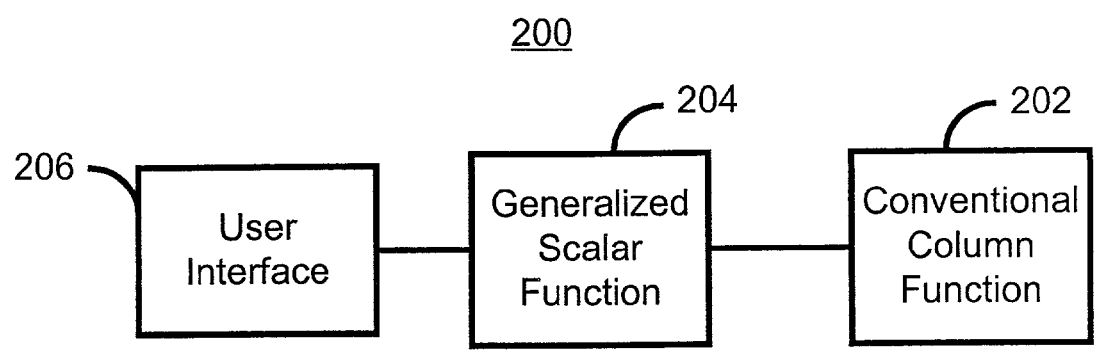
FIG. 5 is a block diagram of one embodiment of a system in accordance with the present invention for utilizing a column function with one or more rows of a table.

FIG. 5 is a block diagram of one embodiment of a system 200 in accordance with the present invention for utilizing a column function with one or more rows of a table. The system 200 includes a conventional column function 202, a generalized scalar function 204 and a user interface 206. The user interface 206 is to allow the user to input information to and receive information from the system 200. For example, the user may input the arguments to the generalized scalar function 204 and receive the output returned by the conventional column function 202 through the user interface 206. The generalized scalar function 204 is used to communicate with the conventional column function 202 and simulate the column environment, as described above in the methods 100 and 150. The conventional column function 202 performs its operations, generally in an initialization phase, an evaluation phase and a finalization phase, and returns a result. Thus, the system 200 implements the method 100 or 150 to allow the conventional column function 202 to perform operations on rows 6, 7 and 8 of a table 1.

A method and system has been disclosed for utilizing a conventional column function with rows of data in a table. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for utilizing a column function for a relational database in a structure query language (SQL) environment, the column function for performing an operation on an indeterminate number of entries, the relational database utilizing data including a plurality of entries being organized into a table having at least one column and at least one row of the entries, wherein the computer performs the following functions comprising:

(a) using a processor to receive at least one user-specified row of the at least one row of entries specified by input from a user;

(b) using the processor to simulate a column with the entries of the at least one user-specified row, including using the at least one user-specified row as an argument for a generalized scalar function, such that the generalized scalar function provides the entries of the at least one user-specified row to the column function as though the entries of at the least one user-specified row were arranged in the column, the column function operable on the column as an argument of the column function and not operable on the at least one user-specified row as the argument of the column function; and (c) using the processor to perform the column function on the entries of the at least one user-specified row to provide at least one output.

2. The computer implemented method of claim 1, wherein the receiving at least one user-specified row further includes:
fetching the at least one user-specified row of the at least one row.

3. The computer implemented method of claim 2, wherein the at least one user-specified row is a plurality of user-specified rows, and wherein the column function performing further includes:
   (c1) using the processor to perform the column function on the entries of one of the user-specified rows to provide an output; and wherein the method further includes
   (d) repeating the fetching, simulating, and performing the column function for each remaining user-specified row of the plurality of user-specified rows.

4. The computer implemented method of claim 1, wherein the at least one output of the column function includes a maximum value of values in the entries in each of the at least one user-specified row.

5. The computer implemented method of claim 1, wherein the at least one output of the column function includes a minimum value of values in the entries in each of the at least one user-specified row.

6. The computer implemented method of claim 1, wherein the column function performing further includes:
   (c1) performing an initialization phase in response to a first entry of each of the at least one user-specified row;
   (c2) performing an evaluation phase on each entry of the at least one user-specified row; and
   (c3) performing a finalization phase after evaluation of a last entry of the at least one user-specified row.

7. The computer implemented method of claim 1, wherein the generalized scalar function in combination with the column function allow the operation of the column function to be performed for the indeterminate number of entries in the at least one user-specified row.

8. The computer implemented method of claim 1, wherein each of the plurality of entries corresponds to an intersection of one of the at least one row and one of the at least one column.

9. A computer program product tangibly stored on a computer-readable medium for utilizing a column function for a relational database in a structure query language (SQL) environment in a computer system, the column function for performing an operation on an indeterminate number of entries, the relational database utilizing data including a plurality of entries being organized into a table having at least one column and at least one row of the entries, the product including instructions for:
   (a) using a processor to receive at least one user-specified row of the at least one row of entries specified by input from a user;
   (b) using the processor to simulate a column with the entries of the at least one user-specified row, including using the at least one user-specified row as an argument for a generalized scalar function, wherein the generalized scalar function provides the entries of the at least one user-specified row to the column function as though the entries of at the least one user-specified row were arranged in the column, the column function operable on the column as an argument of the column function and not operable on the at least one user-specified row as the argument of the column function; and
   (c) using the processor to perform the column function on the entries of the at least one user-specified row to provide at least one output.

10. The computer program product of claim 9, wherein the instructions for receiving at least one user-specified row further includes instructions for:
   fetching the at least one user-specified row of the at least one row.

11. The computer program product of claim 9, wherein the at least one user-specified row is a plurality of user-specified rows, and wherein the column function performing instructions (c) further includes instructions for:
   c1) using the processor to perform the column function on the entries of one of the user-specified rows to provide an output; and wherein the program further includes instructions for
   (d) repeating instructions the fetching, simulating, and performing the column function for each remaining user-specified row of the plurality of user-specified rows.

12. The computer program product of claim 9, wherein the at least one output of the column function includes a maximum value of each of the at least one user-specified row.

13. The computer program product of claim 9, wherein the at least one output of the column function includes a minimum value of each of the at least one user-specified row.

14. The computer program product of claim 9, wherein the column function performing instruction (c) further includes instructions for:
   (c1) performing an initialization phase in response to a first entry of each of the at least one user-specified row;
   (c2) performing an evaluation phase on each entry of the at least one user-specified row; and
   (c3) performing a finalization phase after evaluation of a last entry of the at least one user-specified row.

15. The computer program product of claim 9, wherein the generalized scalar function in combination with the column function allow the operation of the column function to be performed for the indeterminate number of entries in the at least one user-specified row.

16. The computer program product of claim 9, wherein each of the plurality of entries corresponds to an intersection of one of the at least one row and one of the at least one column.

17. A computer implemented system for utilizing a column function for a relational database in a structure query language (SQL) environment, comprising:
   data storage of the relational database, the data storage storing data including a plurality of entries organized into a table having at least one column and at least one row of the entries;
   a processor performing the following functions:
   a column function for performing an operation on an indeterminate number of entries, the column function operable on the at least one column as an argument of the column function and not operable on the at least one row as the argument of the column function;
   a generalized scalar function for simulating a column with the entries of at least one user-specified row of the at least one row of entries, the at least one user-specified row being used as an argument for the generalized scalar function such that the generalized scalar function provides the entries of the at least one user-specified row to the column function as though the entries of the at least one user-specified row were arranged in a column, such that the column function performs an operation on the entries of the at least one user-specified row to provide at least one output; and
   an interface for allowing a user to specify the at least one user-specified row as an argument for the generalized scalar function.

18. The computer implemented system of claim 17, wherein the generalized scalar function further fetches the at least one user-specified row of the at least one row.

19. The computer implemented system of claim 17, wherein the at least one output of the column function includes a maximum value of values in the entries in each of the at least one user-specified row.

20. The computer implemented system of claim 17, wherein the at least one output of the column function includes a minimum value of values in the entries in each of the at least one user-specified row.

21. The computer implemented system of claim 17, wherein the column function performs the operation by performing an initialization phase in response to a first entry of each of the at least one user-specified row, performing an evaluation phase on each entry of the at least one user-specified row and performing a finalization phase after evaluation of a last entry of the at least one user-specified row.

22. The computer implemented system of claim 17, wherein the generalized scalar function in combination with the column function allow the operation of the column function to be performed for the indeterminate number of entries in the at least one user-specified row.

23. The computer implemented system of claim 17, wherein each of the plurality of entries corresponds to an intersection of one of the at least one row and one of the at least one column.

24. A computer implemented method for utilizing a column function for a relational database in a structure query language (SQL) environment, the column function for performing an operation on an indeterminate number of entries, the relational database utilizing data including a plurality of entries being organized into a table having at least one column and at least one row of the entries, each of the at least one row including a plurality of entries, wherein the computer performs the following functions comprising:
 a) using a processor to receive at least one user-specified row of the at least one row of entries specified by input from a user as an argument for a generalized scalar function, the generalized scalar function operable on the at least one row as the argument of the generalized scalar function;
 b) using the processor to fetch a first user-specified row of the at least one user-specified row and cause the generalized scalar function to provide an entry in the first user-specified row to the column function as though the entry of the first user-specified row was in a column, the column function operable on the column as an argument of the column function and not operable on the first user-specified row as the argument of the column function;
 c) using the processor to perform an initialization for the column function in response to the received entry being a first entry of the first user-specified row;
 d) using the processor to evaluate data in the entry of the first user-specified row according to the column function;
 e) in response to determining with the processor that one or more entries remain to be evaluated in the first user-specified row, using the processor to repeat steps b), c) and d) with another entry in the first user-specified row until no entries remain to be evaluated in the first user-specified row;
 f) using the processor to perform finalization of the column function for the first user-specified row and to provide an output of the column function; and
 g) in response to determining with the processor that one or more of the at least one user-specified row remain to be fetched and provided to the column function, repeating steps b), c), d), e), and f) with another user-specified row until all of the at least one user-specified row have been fetched and provided to the column function.

25. The computer implemented method of claim 24, wherein each of the plurality of entries corresponds to an intersection of one of the at least one row and one of the at least one column.

26. The computer implemented method of claim 24, wherein the column function includes one of the following: a maximum value of each of the at least one user-specified row, and a minimum value of each of the at least one user-specified row.

* * * * *